United States Patent Office 3,072,629
Patented Jan. 8, 1963

---

3,072,629
ALUMINUM ALKYL-TRANSITION METAL HALIDE CATALYST MODIFIED WITH AN ARSINE OR STIBINE COMPOUND
Harry W. Coover, Jr., and Newton H. Shearer, Jr., Kingsport, Tenn., assignors to Eastman Kodak Company, Rochester, N.Y., a corporation of New Jersey
No Drawing. Filed Mar. 15, 1961, Ser. No. 95,781
12 Claims. (Cl. 260—93.7)

This invention relates to a new and improved polymerization process and is particularly concerned with the use of a novel catalyst combination for preparing high molecular weight solid polyolefins, such as polypropylene, of high density and crystallinity. In a particular aspect, the invention is concerned with the preparation of polypropylene and higher polyolefins having a high crystallinity and a high density using a particular catalyst combination which has unexpected catalytic activity.

This application is a continuation-in-part of our copending application Serial No. 724,904, filed March 31, 1958, now abandoned.

Polyethylene has heretofore been prepared by high pressure processes to give relatively flexible polymers having a rather high degree of chain branching and a density considerably lower than the theoretical density. Thus pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

Catalyst compositions containing metal alkyls and transition metal compounds have been found to be effective for polymerizing olefins in low temperature, low pressure procedures and among the most effective catalysts are the mixtures of a trialkyl aluminum and either titanium trichloride or vanadium trichloride. When these catalysts are employed to polymerize propylene, the product has been found to have an inherent viscosity within the range of about 1 to 3 and a crystallinity of about 70 to 75%. Also, such polymers have inadequate stiffness, thermal stability and softening point for many commercial applications unless stabilized and subjected to rather extensive extraction procedures for removal of oils and rubbery polymers.

It is an object of this invention to provide a novel and improved process for polymerizing propylene and higher α-monoolefins to form polymers of increased inherent viscosity and molecular weight and of substantially higher crystallinity. It is a particular object of this invention to provide a novel and improved process for polymerizing propylene in the presence of an improved catalyst composition containing a trialkyl aluminum and either titanium trichloride or vanadium trichloride. As a result of the use of this improved catalyst composition the inherent viscosity and crystallinity of the polymer are unexpectedly improved resulting in a polymer of substantially increased molecular weight and impact strength and in substantially increased clarity of molded objects. Other objects of this invention will be apparent from the description and claims which follow.

The above and other objects are attained by means of this invention, wherein α-monoolefins, either singly or in admixture, are readily polymerized to high molecular weight solid polymers by effecting the polymerization in the presence of a catalytic mixture containing an aluminum compound having the formula $R_3Al$ wherein R is selected from the group consisting of alkyl radicals containing from 1 to 12, preferably 1 to 4, carbon atoms, phenyl and benzyl, a trihalide of a transition metal selected from the group consisting of titanium and vanadium, and a third component which is a compound having the formula $R_3Z$ wherein Z is a group Va element selected from the group consisting of arsenic and antimony and each R is a radical selected from the group consisting of hydrogen and hydrocarbon radicals containing 1 to 12 carbon atoms and selected from the group consisting of alkyl, aryl and aralkyl. Among these hydrocarbon radicals are methyl, ethyl, propyl, butyl, phenyl, phenylethyl, naphthyl, octyl and dodecyl. In the group Va compound the three radicals represented by R can be the same or different. The significantly improved properties of the polymers produced with the above catalyst were completely unexpected. The inventive process is carried out in liquid phase in an inert organic liquid and preferably an inert liquid hydrocarbon vehicle, but the reaction can be conducted in the absence of diluent. The process proceeds with excellent results over a temperature range of from 0° C. to 250° C. although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30 to 1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of highly crystalline polypropylene although it can be used for polymerizing mixtures of ethylene and propylene, the butenes and styrene as well as the other α-monoolefins containing up to 10 carbon atoms. The polypropylene produced in accordance with this invention possesses properties that are quite unexpected. The inherent viscosity and crystallinity of the polymer as well as the molecular weight, impact strength and clarity are substantially and unexpectedly improved. The high molecular weight, high density polymers of this invention are insoluble in solvents at ordinary temperatures but are partially soluble in such solvents as xylene, toluene or tetralin at elevated temperatures. These solubility characteristics make it possible to carry out the polymerization process under conditions wherein the polymer formed is soluble in the reaction medium during the polymerization and can be precipitated therefrom by lowering the temperature of the resulting mixture. The polypropylene produced by practicing this invention has a softening point above 155° C. and a density of 0.91 and higher. Usually the density of the polypropylene is of the order of 0.91 to 0.92.

The polypropylene and other polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polypropylene obtained according to this process. Other poly-α-olefins as well as copolymers of ethylene and propylene can also be prepared and have similarly improved properties.

As has been indicated above, the improved results obtained in accordance with this invention depend upon the particular catalyst combination. Thus, one of the components of the catalyst is an aluminum compound as defined hereinabove and preferably a trialkyl aluminum wherein the alkyl radicals contain from 1 to 12, preferably from 1 to 4 carbon atoms, for example, methyl, ethyl, propyl, butyl and the like. The preferred trialkyl aluminum compounds are the lower alkyl derivatives, and the most preferred is triethyl aluminum. Another component of the catalyst composition is a trihalide of a transition metal selected from the group consisting of titanium and vanadium wherein the halogen is selected from the group consisting of chlorine, bromine and iodine. The third component of the catalyst composition is a compound having the structural formula $R_3Z$ wherein Z is a group Va element selected from the group consisting of arsenic and antimony. Each R is a radical selected from the group consisting of hydrogen and hydrocarbon radicals containing 1 to 12 carbon atoms as defined hereinabove. Preferably R is selected from the group consisting of lower alkyl containing 1 to 4 carbon atoms and phenyl. In this third component the R radicals can be the same but in some instances different radicals are used.

Catalyst compositions that can be used in practicing our invention are:

(1) Triethyl aluminum, titanium trichloride and triphenyl stibine;
(2) Triethyl aluminum, vanadium trichloride and triphenyl arsine;
(3) Triphenyl aluminum, titanium tribromide and triethyl stibine;
(4) Tribenzyl aluminum, titanium triiodide and tripropyl arsine;
(5) Trimethyl aluminum, vanadium tribromide and tributyl stibine;
(6) Tridodecyl aluminum, vanadium triiodide and tripentyl arsine;
(7) Tridecyl aluminum, titanium trichloride and trihexyl stibine;
(8) Trioctyl aluminum, vanadium trichloride and triheptyl arsine;
(9) Trihexyl aluminum, titanium trichloride and trioctyl stibine; and
(10) Tributyl aluminum, vanadium trichloride and tridodecyl arsine.

The limiting factor in the temperature of the process appears to be the decomposition temperature of the catalyst. Ordinarily, temperatures from 50° C. to 150° C. are employed, although temperatures as low as 0° C. or as high as 250° C. can be employed if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymer of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to 10% by weight based on the weight of the vehicle, and for a slurry type of process higher concentrations, for example up to 40% and higher, are preferred. Higher concentrations of monomer ordinarily increase the rate of polymerization, but concentrations above 5 to 10% by weight in a solution process are ordinarily less desirable because the polymer dissolved in the reaction medium results in a very viscous solution.

The molar ratio of aluminum compound to transition metal trihalide can be varied within the range of 1:0.5 to 1:2, and the molar ratio of trihalide to the third component of the catalytic mixture can be varied within the range of 1:1 to 1:0.1, but it will be understood that higher and lower molar ratios are within the scope of this invention. A particularly effective catalyst contains one mole of transition metal compound and 0.25 mole of the third component per mole of aluminum compound. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-pentane, n-octane, isooctane, methyl cyclohexane, tetralin, decalin and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

A particularly effective catalyst for polymerizing propylene and other α-monoolefins in accordance with this invention is a mixture of triethyl aluminum, titanium trichloride and triphenyl arsine. The importance of the third component of this reaction mixture is evident from the fact that the presence of the third component makes possible the production of polymers of substantially improved properties.

The invention is illustrated by the following examples of certain preferred embodiments thereof.

Example 1

Into a clean, dry stainless steel autoclave under an atmosphere of nitrogen, was placed one g. of total catalyst comprising a 1/0.5/1 molar ratio of triethylaluminum/triphenylstibine/titanium trichloride. The autoclave was capped, placed in a rocker; and 100 g. of propylene was added. The mixture was heated to 85° C. with rocking and maintained there for 4 hours. The autoclave was then uncapped and the contents treated with dry isobutanol to remove catalyst components. A good yield, 96.5 g. of highly crystalline polypropylene with a melting point of 180° was obtained. The inherent viscosity (I.V) of the product was 4.15.

Example 2

Following the procedure of Example 1, 2 g. of total catalyst comprising a 2/1/1 ratio, respectively, of tridodecylaluminum/trimethylarsine/vanadium trichloride was employed with 100 g. of 1-butene at a polymerization temperature of 55° C. for 6 hours. The product was worked up with isobutanol and a yield of 87 g. of highly crystalline poly(1-butene) was obtained; the I.V. was 3.7. In the same manner a 90/10 copolymer of propylene/1-butene was prepared in a yield of 92 g.

Example 3

The procedure of Example 1 was used with a catalyst loading of 1 g. made up of a 1/0.6/1 molar ratio of triphenylaluminum/triphenylarsine/titanium trichloride. The autoclave was loaded with 100 g. of 4-methyl-1-pentene and the polymerization was carried out for a period of 3 hours at 150° C. The highly crystalline poly(4-methyl-1-pentene) produced, weighed 74 g.; the I.V. was 3.8.

Example 4

The procedure of Example 1 was employed using a total catalyst weight of 2 g. comprising a 1/0.5/1 molar ratio of tribenzylaluminum/trimethylarsine/titanium trichloride. The polymerization was carried out at 125° C. for 8 hours using 100 g. of 3-methyl-1-butene. At the end of this period an 83-g. yield of highly crystalline poly(3-methyl-1-butene) was obtained.

Example 5

The procedure of Example 1 was used with 100 g. of 1-octene as the monomer with a total catalyst weight of 2.0 g. comprising a 1/0.2/2.0 molar ratio of trimethylaluminum/tridodecylstibine/titanium tribromide. The polymerization was carried out at 85° C. for a period of 4 hours after which an 88-g. yield of poly(1-octene) was obtained.

Example 6

100 g. of styrene was polymerized in the manner described in Example 1 using 2 g. of catalyst comprising a 1/0.6/1 molar ratio of triethylaluminum/tridodecylarsine/vanadium trichloride. The polymerization was carried out at 85° C. for a period of 4 hours after which the yield of highly crystalline polystyrene was 79 g.

Example 7

The procedure of Example 1 was used with 100 g. of allylcyclohexane as the monomer and using 2 g. of total catalyst comprising a 1/0.5/1 molar ratio of triethylaluminum/diphenylstibine/titanium triiodide. After the monomer had been loaded into the autoclave an additional partial pressure of 50 p.s.i. of hydrogen was added. Following a polymerization period of 6 hours at 75° C., a yield of 87 g. of poly(allylcyclohexane) of high crystallinity was obtained; the I.V. of the product was 0.5.

Example 8

The procedure of Example 1 was followed with 100 g. of allylbenzene and a catalyst comprising 1.5 g. of a 1/0.6/1 molar ratio of triethylaluminum/trimethylstibine/vanadium tribromide. Polymerization was carried out for a period of 4 hours at 80° C. After removal of catalyst components using dry isobutanol, the yield of highly crystalline poly(allylbenzene) was 56 g.

Example 9

100 g. of dodecene was used in the procedure described in Example 1 with 2 g. of catalyst comprising a 1/0.5/1 molar ratio of triethylaluminum/diphenylarsine/vanadium triiodide. Following a polymerization period of 6 hours at 85° C., a 51-g. yield of poly(1-dodecene) was obtained.

The crystalline polyolefins prepared as described in these examples have greater impact strength and greater rigidity or stiffness than corresponding polyolefins prepared in the absence of the stibine or arsine third components.

The diluents that are employed in practicing this invention can be advantageously purified prior to use in the polymerization reaction by contacting the diluent, for example in a distillation procedure or otherwise, with the polymerization catalyst to remove undesirable trace impurities. Also, prior to such purification of the diluent the catalyst can be contacted advantageously with polymerizable α-monoolefins.

Thus, by means of this invention polyolefins such as polypropylene are readily produced using a catalyst combination whose improved effectiveness could not have been predicted. The polymers thus obtained can be extruded, mechanically milled, cast or molded as desired. The polymers can be used as blending agents with relatively more flexible polyhydrocarbons to give any desired combination of properties. The polymers can also be blended with antioxidants, stabilizers, plasticizers, fillers, pigments and the like, or mixed with other polymeric materials, waxes and the like.

From the detailed disclosure of this invention it is quite apparent that in this polymerization procedure a novel catalyst, not suggested in prior art polymerization procedures, is employed. As a result of the use of this novel catalyst it is possible to produce polymeric hydrocarbons, particularly polypropylene, having properties not heretofore obtainable. For example, polypropylene prepared in the presence of catalyst combination within the scope of this invention is substantially free of rubbery and oily polymers and thus it is not necessary to subject such polypropylene of this invention to extraction procedures in order to obtain a commercial product. Also polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example by washing with water or lower aliphatic alcohols such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

Although the invention has been described in considerable detail with reference to certain preferred embodiments thereof, variations and modifications can be effected within the spirit and scope of this invention as described hereinabove and as defined in the appended claims.

We claim:

1. In the polymerization of α-olefinic hydrocarbon containing at least three carbon atoms to form solid crystalline polymer, the improvement which comprises catalyzing the polymerization with a catalytic mixture consisting essentially of an aluminum compound having the formula $R_3Al$ wherein each R is a hydrocarbon radical containing 1 to 12 carbon atoms and selected from the group consisting of alkyl, aryl and aralkyl, a trihalide of a transition metal selected from the group consisting of titanium and vanadium and a third component selected from the group consisting of compounds having the structural formula $R_3Z$ wherein Z is a group Va element selected from the group consisting of arsenic and antimony and each R is a radical selected from the group consisting of hydrogen, and hydrocarbon radicals containing 1 to 12 carbon atoms and selected from the group consisting of alkyl, aryl and aralkyl said third component being present in an amount sufficient to increase the crystallinity and inherent viscosity of said polymer.

2. In the polymerization of propylene to form solid crystalline polymer, the improvement which comprises effecting the polymerization in the presence of a catalytic mixture consisting essentially of a tri-lower alkyl aluminum, a titanium trihalide and a third component selected from the group consisting of compounds having the structural formula $R_3Z$ wherein Z is a group Va element selected from the group consisting of arsenic and antimony and each R is a radical selected from the group consisting of hydrogen and hydrocarbon radicals containing 1 to 12 carbon atoms and selected from the group consisting of alkyl, aryl and aralkyl the molar ratio of titanium trihalide to third component being within the range of 1:1 to 1:0.1.

3. In the polymerization of propylene to form solid crystalline polymer, the improvement which comprises effecting the polymerization in the presence of a catalytic mixture consisting essentially of a tri-lower trialkyl aluminum, a vanadium trihalide and a third component selected from the group consisting of compounds having the structural formula $R_3Z$ wherein Z is a group Va element selected from the group consisting of arsenic and antimony and each R is a radical selected from the group consisting of hydrogen and hydrocarbon radicals containing 1 to 12 carbon atoms and selected from the group consisting of alkyl, aryl and aralkyl, the molar ratio of vanadium trihalide to third component being within the range of 1:1 to 1:0.1.

4. In the polymerization of propylene to form solid crystalline polymer, the improvement which comprises effecting the polymerization in liquid dispersion in an organic liquid and in the presence of a catalytic mixture consisting essentially of a molar ratio of triethyl aluminum and titanium trichloride of 1:0.5 to 1:2 and a molar ratio of titanium trichloride and triphenyl arsine within the range of 1:1 to 1:0.1.

5. The method according to claim 4 wherein the polymerization is effected at a temperature of 55 to 150° C. and a pressure not exceeding 1000 p.s.i.

6. In the polymerization of propylene to form solid crystalline polymer, the improvement which comprises effecting the polymerization in liquid dispersion in an inert organic liquid and in the presence of a catalytic mixture consisting essentially of a molar ratio of triethyl aluminum and vanadium trichloride within the range of 1:0.5 to 1:2 and a molar ratio of vanadium trichloride to triphenyl stibine within the range of 1:1 to 1:0.1.

7. The method according to claim 6 wherein the polymerization is effected at a temperature of 55 to 150° C. and a pressure not exceeding 1000 p.s.i.

8. As a composition of matter, a polymerization catalyst consisting essentially of an aluminum compound having the formula $R_3Al$ wherein each R is a hydrocarbon radical containing 1 to 12 carbon atoms and selected from the group consisting of alkyl, aryl and aralkyl, a trihalide of a transition metal selected from the group consisting of titanium and vanadium and a third component selected from the group consisting of compounds having the structural formula $R_3Z$ wherein Z is a group Va element selected from the group consisting of arsenic and antimony and each R is a radical selected from the group consisting of hydrogen, and hydrocarbon radicals containing 1 to 12 carbon atoms and selected from the group consisting of alkyl, aryl and aralkyl, said third component being present in an amount sufficient to increase the crystallinity and inherent viscosity of polymer produced with said catalyst.

9. As a composition of matter, a polymerization catalyst consisting essentially of a tri-lower alkyl aluminum, a titanium trihalide and a third component selected from the group consisting of compounds having the structural formula $R_3Z$ wherein Z is a group Va elements selected from the group consisting of arsenic and antimony and each R is a radical selected from the group consisting of hydrogen and hydrocarbon radicals containing 1 to 12 carbon atoms and selected from the group consisting of alkyl, aryl and aralkyl, the molar ratio of titanium trihalide to third component being within the range of 1:1 to 1:0.1.

10. As a composition of matter, a polymerization catalyst consisting essentially of a tri-lower trialkyl aluminum, a vanadium trihalide and a third component selected from the group consisting of compounds having the structural formula $R_3Z$ wherein Z is a group Va element selected from the group consisting of arsenic and antimony and each R is a radical selected from the group consisting of hydrogen and hydrocarbon radicals containing 1 to 12 carbon atoms and selected from the group consisting of alkyl, aryl and aralkyl, the molar ratio of vanadium trihalide to third component being within the range of 1:1 to 1:0.1.

11. As a composition of matter, a polymerization catalyst consisting essentially of a molar ratio of triethyl aluminum and titanium trichloride of 1:0.5 to 1:2 and a molar ratio of titanium trichloride and triphenyl arsine within the range of 1:1 to 1:0.1.

12. As a composition of matter, a polymerization catalyst consisting essentially of a molar ratio of triethyl aluminum and vanadium trichloride within the range of 1:0.5 to 1:2 and a molar ratio of vanadium trichloride to triphenyl stibine within the range of 1:1 to 1:0.1.

References Cited in the file of this patent
UNITED STATES PATENTS 2,968,652    Mertes _____ Jan. 17, 1961